Inventor:
Lawe Herbert Westesson
By
Kien W. Flocks
Attorney

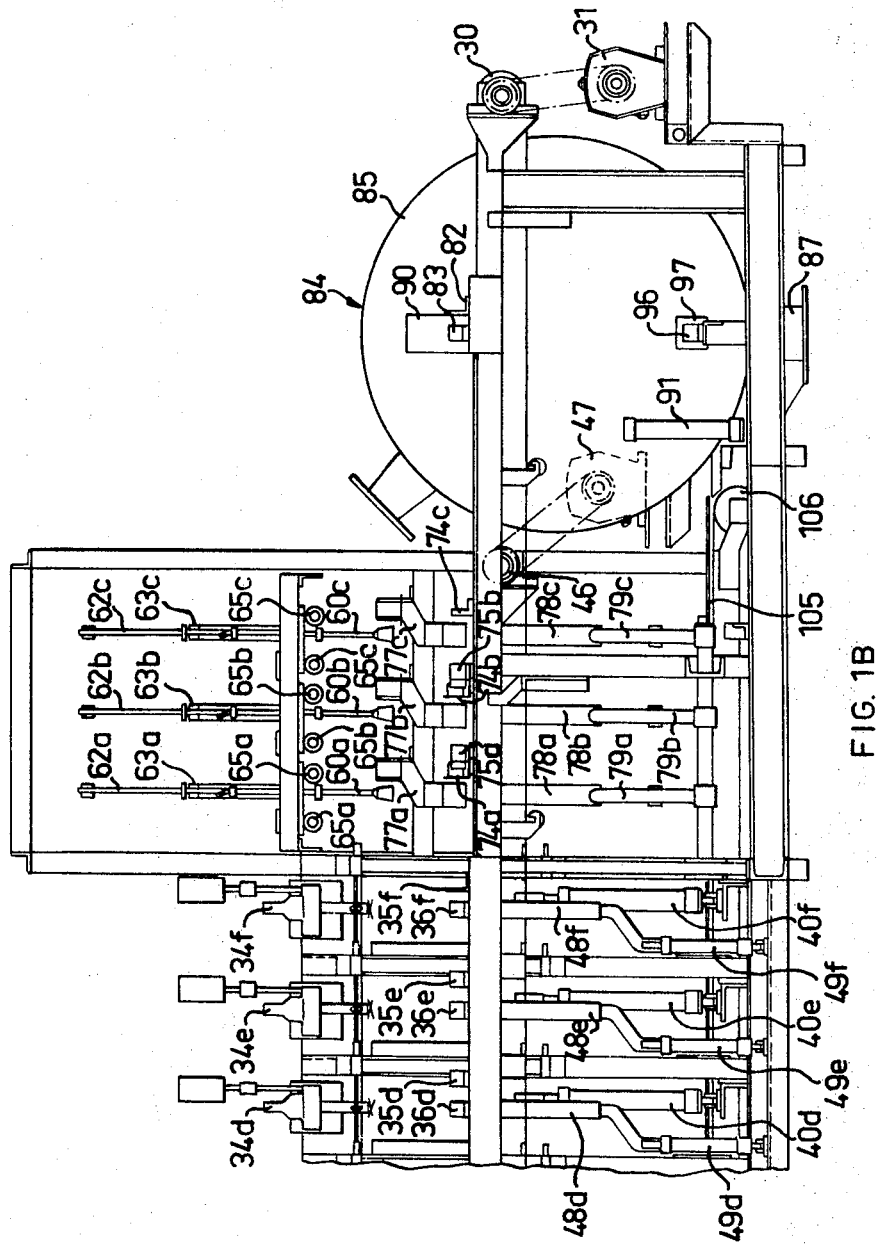

Inventor:
Lawe Herbert Westesson
By
Korn W. Flocks
Attorney

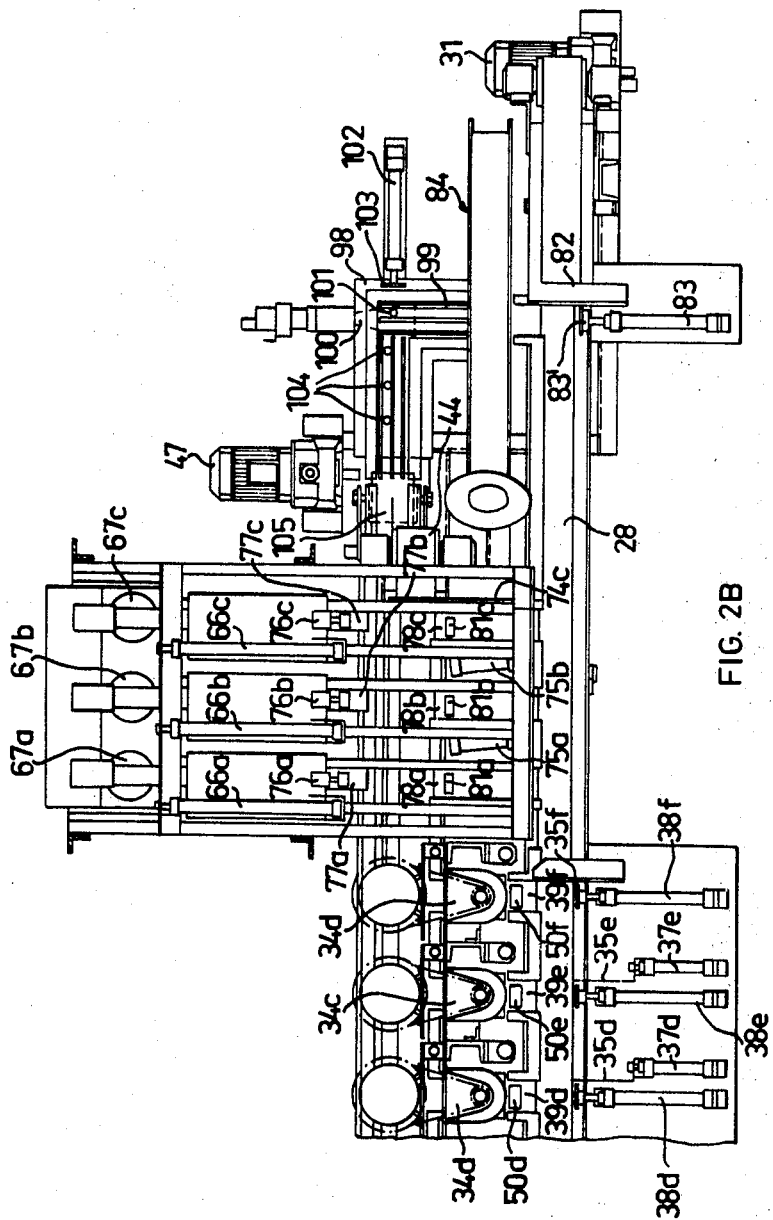

United States Patent Office 3,517,709
Patented June 30, 1970

3,517,709
LABORATORY SYSTEM FOR AUTOMATICALLY ANALYZING MASHED SUGAR BEET SAMPLES
Lawe Herbert Westesson, Arlov, Sweden, assignor to Ingeniorsfirman Nils Weibull AB, Malmo, Sweden
Filed Feb. 29, 1968, Ser. No. 709,378
Int. Cl. B65b 1/30, 3/26
U.S. Cl. 141—83                5 Claims

ABSTRACT OF THE DISCLOSURE

In a laboratory system samples of mashed sugar beets are automatically analyzed in respect of their sugar content as the samples in open-top sample containers are conveyed through a number of stations distributed in a row along belt conveyors, in which stations various analyzing steps are performed. Having traveled through said row of stations, the sample containers are returned from one end of the row of stations to the other on a return conveyor. The belt conveyors convey the sample containers as individual elements loosely placed thereon, and means transfer the containers from either of a pair of feed conveyors to a station and from that station to the other of said pair of feed conveyors, and also transfer the containers between the feed conveyors on one hand and the return conveyor on the other hand while the containers are simultaneously turned and washed clean so that they can receive new samples to be analyzed.

---

This invention relates to a laboratory system for automatically analyzing mashed sugar beet samples in respect of their sugar content. The laboratory system comprises a number of open-top sample containers in the form of cans and means for conveying said sample containers through various stations for performing different analyzing steps. The invention has been developed to permit a rational and exact determination of the sugar content of sugar beets delivered to the sugar factories, without much manual work and without undesirable fluctuations in the sugar content determination by reason of the determination being non-uniform from one sample to the other.

The characteristic features of the laboratory system according to the present invention reside in that the conveyor means include a pair of parallel conveyors disposed substantially on the same level as and on either side of a number of stations arranged in a row along said conveyors and serving to move the containers through said stations, and means for transferring the containers, conveyed as individual elements on the conveyors, from either conveyor to a station and from there to the other conveyor, as well as a further conveyor located on a higher or lower level for returning the containers from one end of the row of stations to the other end thereof after said containers have passed through said row of stations, and means for transferring the containers between the feed conveyors on one hand and the return conveyor on the other hand under simultaneous turning of the conveyors upside down in order that the containers may be returned in upside down position.

For a better understanding of the present invention and to show how the same may be carried into effect, reference will now be made to the accompanying drawings in which:

FIGS. 1A and 1B taken together show a side elevation, in vertical projection, of an embodiment, chosen by way of example, of the laboratory system according to the invention;

FIGS. 2A and 2B taken together show a plan view of the laboratory system in FIGS. 1A and 1B;

Figure 1A:
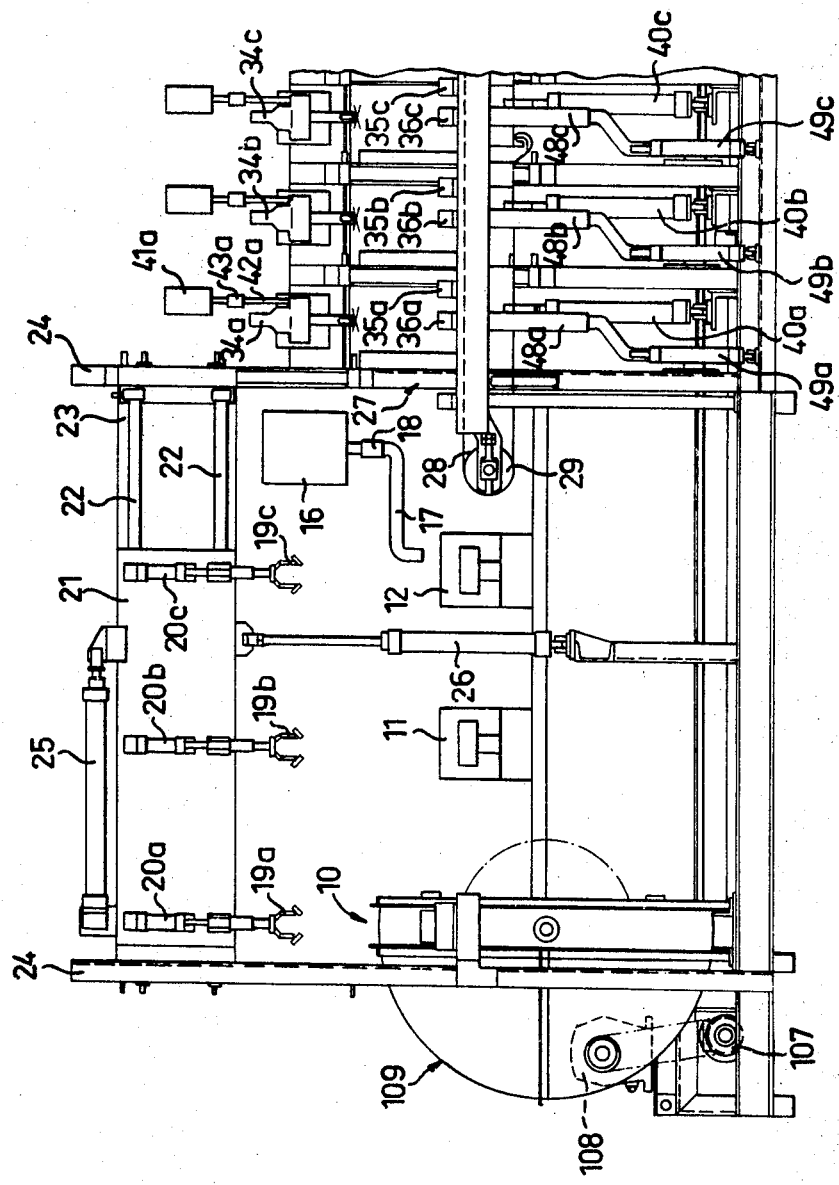
Figure 2A:
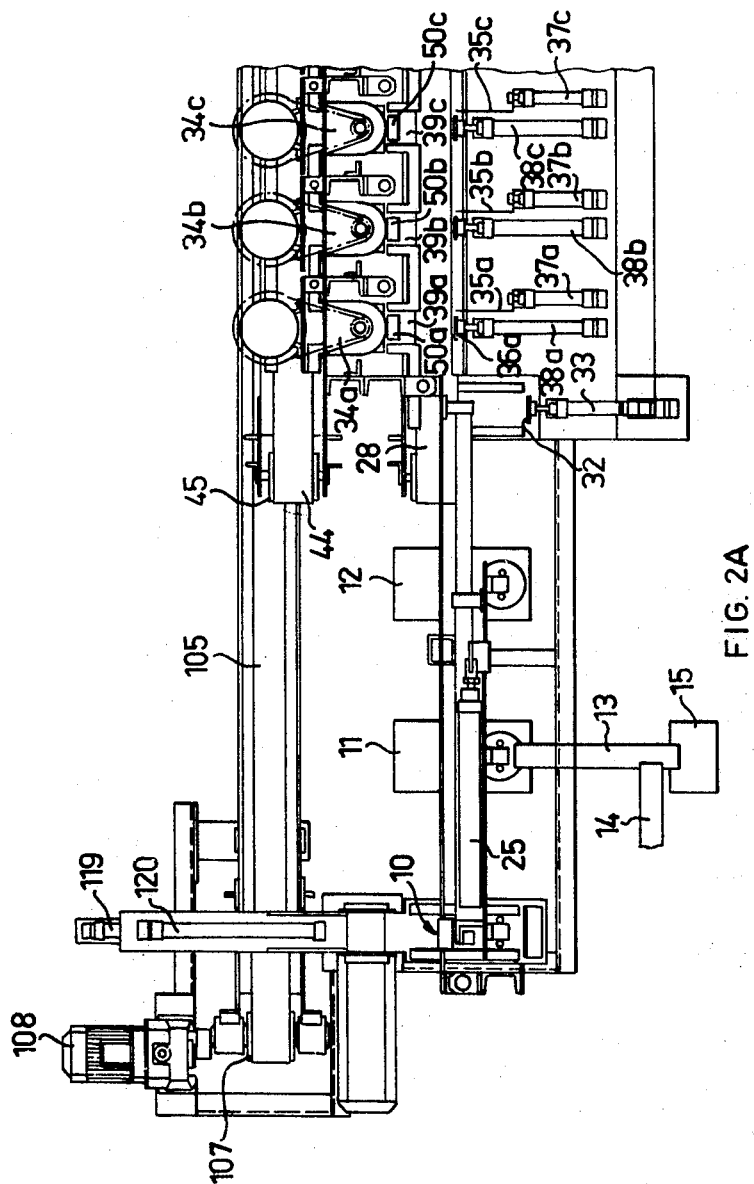

The laboratory system according to the present invention for automatically analyzing mashed sugar beet samples, which is shown in its entirety in FIGS. 1A, 1B, 2A and 2B, includes at one end a supply station 10 where the containers used in the laboratory are supplied in a manner to be described in the following. These containers are cans of circular or four-leaf clover cross-sectional shape, i.e. preferably formed by four circular lobes. The laboratory further comprises a weighing apparatus 11 for weighing a predetermined approximative quantity of mashed sugar beets in a can, and a weighing apparatus 12 for adding water to the mashed sugar beets in the can in a weight ratio of mashed sugar beets to water of 1:3. Supply of mashed beets to a can placed on the weighing apparatus 11 is performed with the aid of a belt conveyor 13 which in turn is supplied with homogeneous mashed beets from a conveyor 14 receiving the mashed beets for instance from the apparatus described in my copending U.S. patent application Ser. No. 590,686, filed Oct. 31, 1966, now U.S. Pat. No. 3,411,558. The conveyor 13 is reversible and its direction of motion is electronically controlled by the weighing apparatus 11 in such a way that the direction of motion of the conveyor is reversed, when a can placed on the weighing apparatus has received the prescribed quantity of mashed beets, for delivering excess mashed beets to a container 15. For admixture of water to the mashed beets there is associated with the weighing apparatus 12 a water container 16 having one or more outlet pipes 17 and a magnet valve 18 electronically controlled by said weighing apparatus 12 and supplying the prescribed quantity of water in response to the weighing operation of the weighing apparatus 12.

For moving the cans step by step from the supply station 10 to the weighing apparatus 11, from there to the weighing apparatus 12 and from this latter apparatus to the remaining system there are provided three identical grippers 19a, 19b, and 19c which are operable each by an air cylinder 20a, 20b, and 20c, respectively. The grippers and their associated air cylinders are spaced apart on a silde 21 a distance equal to the relative distance between stations 10, 11 and 12, and the slide 21 in turn is movably guided on a pair of horizontal guides 22 incorporated in a frame 23 which is vertically adjustable on a pair of vertical uprights 24 constituting part of the stand of the laboratory system. A double-acting air cylinder 25 is disposed between the frame 23 and the slide 21 for moving the slide 21 on the guides 22 in horizontal direction, and a double-acting air cylinder 26 is arranged between the frame and the stand of the laboratory system for moving the frame 23 and the elements supported thereby vertically on the uprights 24. The following motions of the grippers 19a, 19b, and 19c are brought about with the aid of a program device (not shown) and magnet valves controlled thereby for admission of air to the cylinders 20a, 20b, 20c, 25, 26 and for discharge of air therefrom. The frame 23 is lowered from the position shown in FIG. 1A so that the grippers are introduced into the respective cans placed in the stations 10, 11 and 12. When the grippers have been introduced into the cans they are tensioned against the inner side of the walls thereof by the grippers being actuated by the associated cylinders 20a, 20b, 20c, and simultaneously the cans are raised slightly, say about 10 mm., from the base on which they are placed. The slide 21 is then moved to the right by means of cylinder 25 a distance equal to the division between stations 10, 11 and 12, whereupon the grippers are again caused to release the cans which have now been moved one step to the right, i.e. the can in supply station 10 has been deposited on weighing apparatus 11 to there receive mashed sugar beets, the can earlier filled with the mashed beets on weighing apparatus 11 has now been placed on weighing apparatus 12 to there receive water, and the can earlier standing on the weighing apparatus 12 has been placed at stand-by 27 in order to be forwarded later through the remaining system. The frame 23 is then returned to its upper position by the cylinder 26, and the slide 21 is moved to the left back to its earlier position; the elements now again occupy the position shown in FIG. 1A for performing a new operation similar to that described. Each such operation is controlled by the program device and can be initiated from the apparatus delivering mashed sugar beets to the conveyor 13.

The weighing apparatus 11 and 12 are not parts of the present invention. They may be of any known type, possibly modified in point of pure design to conform to the special tasks herein contemplated, and their object is to deliver a signal, when the intended amount of mashed sugar beets and water, respectively, has been filled into the cans on the respective weighing apparatus, for the reversal of the direction of motion of conveyor 13 and the closing of magnet valve 18, respectively.

The sample of mashed sugar beets with water added thereto, which is contained in the can taken from weighing apparatus 12 and placed at 27, shall now be subjected to find comminution, which is performed by means of an apparatus for dispersion of particles of the type described in my copending U.S. patent application Ser. No. 590,687 filed Oct. 31, 1966, now U.S. Pat. No. 3,411,557.

A belt conveyor 28 is provided for conveying the cans from stand-by 27. Said belt conveyor comprises an endless belt pased over an idling return pulley 29 and a driven return pulley 30, said conveyor extending throughout the major portion of the laboratory system. The driven return pulley 30 is connected by a chain or belt transmission to a drive motor 31. A transferring means 32 which is movable by means of a double-acting air cylinder 33 is provided at stand-by 27, and a microswitch (not shown) also disposed at 27 and actuated by the can when the latter is deposited at stand-by 27 by the gripper 19c, is connected to a program device which is then started and as a first measure admits air to the cylinder 33 so that the can at 27 is moved onto the continuously running conveyor 28, whereupon the transferring means 32 is returned to starting position by the program device. Arranged along the conveyor 28 are six particles dispersing apparatus 34a, 34b, 34c, 34d, 34e, 34f, each having a motor-driven spindle and a knife thereon, said apparatus being of the design described in my copending U.S. patent application Ser. No. 590,687 referred to above. These dispersing apparatus shall now be supplied with the cans carried by the conveyor 28, and this is realized by means of gates 35a, 35b, 35c, 35d, 35e, 35f and transferring means 36a, 36b, 36c, 36d, 36e, 36f including double-acting air cylinders 37a, 37b, 37c, 37d, 37e, 37f and 38a, 38b, 38c, 38d, 38e, respectively, said gates being provided along the conveyor 28. The function of the gates and the transferring means are controlled by the program device which is started by the microswitch at stand-by 27, in such a way that the cans arriving on the conveyor 28 are always supplied to the dispersing apparatus 34 which is momentarily free to receive a can. The gate 35 can permanently occupy a position above the conveyor 28, and therefore no air cylinder is provided for this stationary gate. The gate 35 at the dispersing apparatus which is to receive a can, is moved inwardly over the conveyor 28 and arrests the movement of the can on the conveyor, whereupon the transferring means 37 moves the can transversely of the conveyor over a sliding plate 39 (a–f) to a position directly beneath the dispersing apparatus. The gate and the transferring means then return to their normal positions at the same time as the next following gate is released, and when the next can arrives on the conveyor 28 the associated transferring means will function, controlled by the program device, and move the can beneath the associated dispersing apparatus.

As described in my copending U.S. patent application Ser. No. 590,687 referred to above, the can shall be raised towards the dispersing apparatus concentrically about the spindle therein in order to be pressed with its rim against a cover in said dispersing apparatus, through which cover the spindle extends, and this is realized by the aid of double-acting air cylinders 40a, 40b, 40c, 40d, 40e, and 40f which raise the can beneath the associated dispersing apparatus. The program device controls this movement and also the initiation of the dispersing apparatus, and when comminution has proceeded for a predetermined time, the program device breaks the circuit to the drive motor of the dispersing apparatus. While the spindle slows down, vinegar of lead is supplied to the mashed sugar beets, and this supply is performed at the dispersing apparatus 34a from a container 41a through a line 42a having a magnet valve 43a controlled by the program device. Corresponding supply means is provided at the other dispersing apparatus, but they have not been given any reference numerals in order not to crowd the drawings with too many reference numerals not required for the understanding of the invention. The program device then causes the air cylinder 40 (a–f) to return so that the can is again lowered to the level of the conveyor 28.

The can shall now be passed along in the laboratory system for sucking up the sugar juice under filtration thereof, and to this end a further conveyor 44 is disposed on the side of the row of dispersing apparatus 34 a–f opposed to the conveyor 28. Said further conveyor 44 extends in parallel with the conveyor 28 and includes an endless belt passed over an idling return pulley 45 and a driven return pulley 46 which is connected to a drive motor 47. This further conveyor also is in continuous operation. Of course, the cans could be moved from their position beneath the dispersing apparatus onto the conveyor 44 by the transferring means 36 a–f, but in such a case the cans on the conveyor 28 would risk to collide with the transferring means, and for this reason separate transferring means are adapted to move the cans from the dispersing apparatus onto the conveyor 44. These transferring means are in the form of pivotally mounted, scythe-shaped means 48a, 48b, 48c, 48d, 48e and 48f operable by double-acting air cylinders 49a, 49b, 49c, 49d, 49e and 49f from a position in which they are beneath the respective sliding plates 39 a–f through an opening 50a, 50b, 50c, 50d, 50e and 50f in these plates and inwardly over the conveyor 44. The transferring means 48 a–f describe an arcuate path and move the can placed beneath the dispersing apparatus before them onto the conveyor 44.

Figure 3:
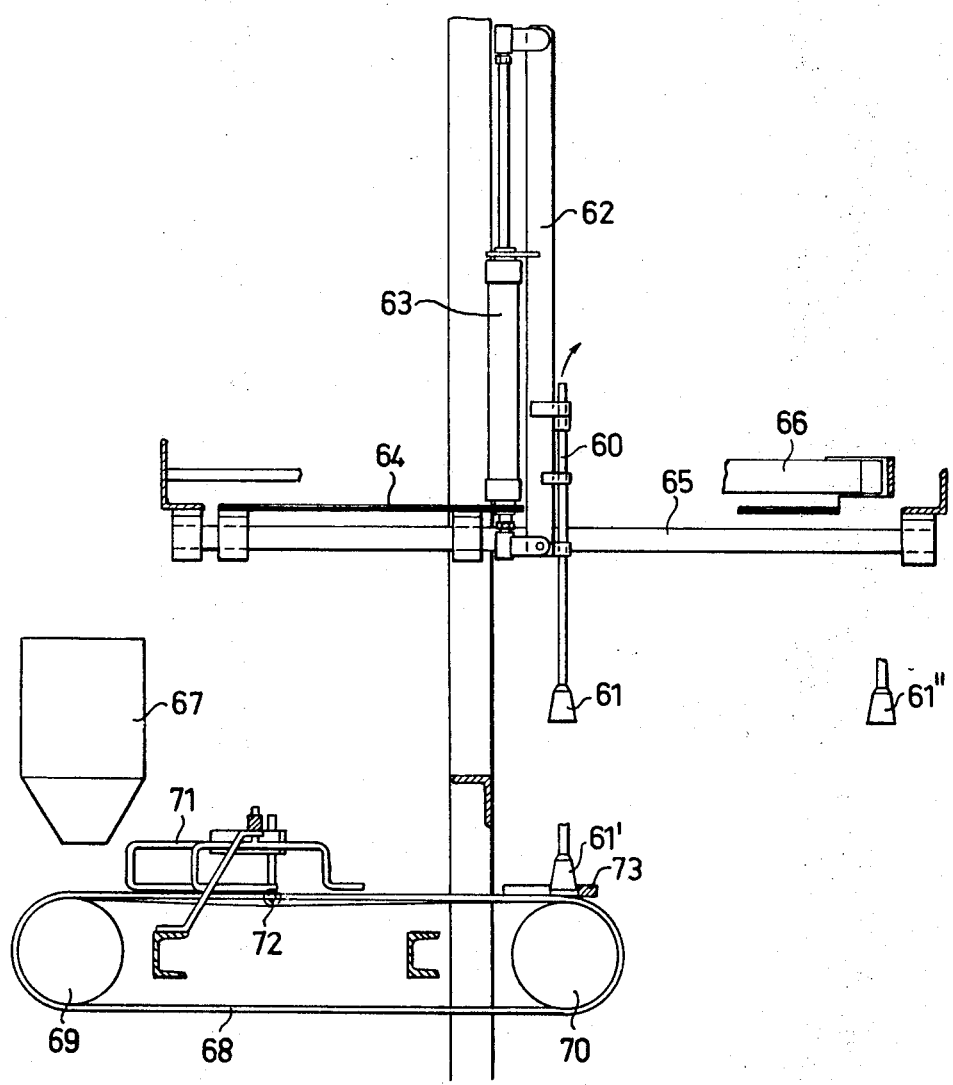
FIG. 3 shows a diagrammatic side elevation of a device incorporated in the laboratory system for supplying filter cartridges and inserting them into a filter funnel.

Sucking up of the sugar juice in the cans is performed in the manner described in my copending U.S. patent application Ser. No. 708,889, filed Feb. 28, 1968. Three filtering stations of the type described in this patent application are provided, and each of these stations includes—as will be seen more clearly from FIG. 3—a suction pipe 60 which is vertical and at the lower end has a funnel-shaped widened portion 61 while it is connected at the other end (in a manner not shown) to a filtering apparatus having a polarimeter for sugar content determination via a device by which the filtrate first sucked up can be separated without being supplied to the polarimeter. The suction pipe 60 is disposed on and carried by a bar 62 which is vertically reciprocable by a double-acting air cylinder 63 which in turn is carried by a slide 64 horizontally movable on guides 65. Shifting of the slide 64 is realized by means of a double-acting air cylinder 66. In FIGS. 1B and 2B the details of the filtering apparatus mentioned in connection with FIG. 3 are provided from right to left with the suffixes a-c for the three filtering stations.

For each sample sucked up by the filtering apparatus use shall be made of a new filter cartridge, and such filter cartridges are delivered from a supply 67 from which the filter cartridges are discharged one at a time by means of a device (not shown) onto a conveyor 68 which includes an endless conveyor belt passed over return pulleys 69 and 70, either of which is motor driven. The filter cartridges which are frusto-conical may be delivered to the conveyor 68 in different positions, but only one position is correct, viz. the position in which the filter cartridge stands upright with its large end on the conveyor. Filter cartridges occupying other positions are moved away from the conveyor 68 by means of a wire guide 71 placed at a point where the conveyor belt is maintained slightly inclined towards one side by a pressure roller 72. The upright filter cartridges are carried by the conveyor 68 to an abutment 73 where the filter cartridges arrange themselves in a row. When the suction pipe 60 is in the FIG. 3 position and the slide 64 is retracted to the FIG. 3 position the suction pipe 60 is moved vertically downwards by the cylinder 63 so that the funnel-shaped widened portion arrives at position 61' and is pushed over a filter cartridge arrested by the abutment 73. Said filter cartridge sticks in the funnel-shaped widened portion 61 and when the direction of motion of the cylinder 63 is then reversed the filter cartridge is taken along with the suction pipe. The slide 64 is then moved by the cylinder 65 to the right as viewed in FIG. 3 so that the funnel-shaped widened portion 61 with the filter cartridge therein will arrive at the FIG. 3 position 61''. The filtering apparatus now is in position for being lowered into a can in a manner that will be described later. The movements of the suction pipe 60 required to pick up filter cartridges, like the other movements in the laboratory system, are controlled by program devices.

Figure 4:
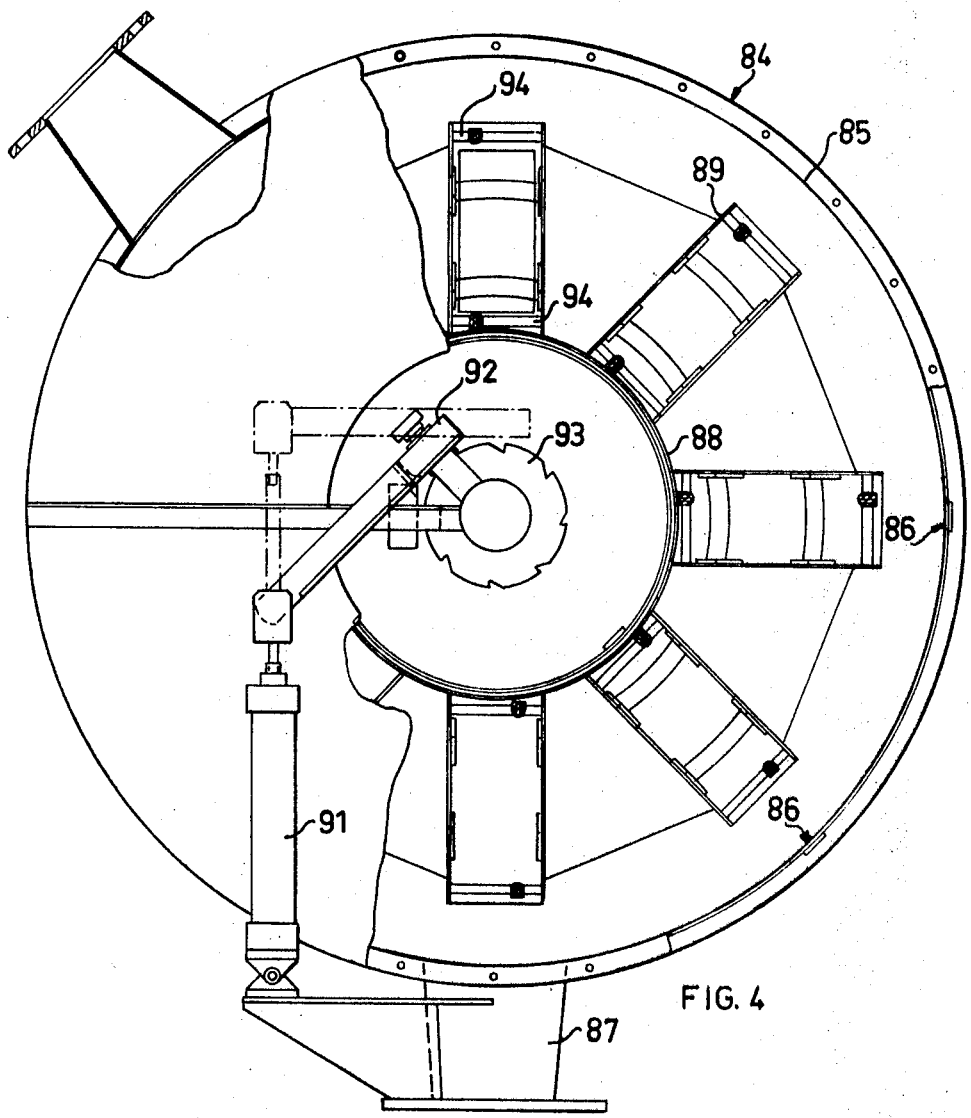
FIG. 4 shows a side elevation of a machine, with parts broken away, for washing the containers used in the laboratory system.

The transfer of the cans supplied by the conveyor 44 to such a position that the filter cartridge occupying position 61'' can be lowered directly into the can, is realized by means similar to those employed for the transfer of the cans from the conveyor 28. For the three filtering stations there are thus provided two gates 74a and 74b which can be moved inwardly over the conveyor belt 44 by associated double-acting air cylinders 75a and 75b, and a stationary gate 74c. The actuation of the two movable gates 74a and 74b takes place in dependence upon the program device in such a way that the cans supplied by the conveyor 44 are arrested ahead of the filtering station which is free to receive a can for filtration. For the transfer of the cans arrested by the gates three double-acting air cylinders 76a, 76b, and 76c are adapted each to actuate one of three transferring means 77a, 77b, and 77c which are movable across the supporting surface of the conveyor 44. The respective transferring means move the cans onto a sliding plate 78a, 83b, and 78c into position straight beneath the filter cartridge when said cartridge occupies position 61''. The suction pipe 60 with the filter cartridge therein is then moved down into the can by the cylinder 63 (a-c) and by placing the suction pipe under vacuum with the aid of a suitable air pump and valves controlled by the program device, the juice in the can is sucked up under filtration thereof by means of the filter cartridge. The filtrate is forwarded to the polarimeter for determination of the sugar content of the liquid in a known manner. While the can still remains on the sliding plate the suction pipe is placed under overpressure by supply of air under pressure thereto for blowing clean the suction pipe and the lines connected thereto in a direction opposed to that in which sucking takes place, the spent filter cartridge 61 being simultaneously ejected into the can. It now remains to empty the can and to clean it so that it can be used for a new sample, and as a first measure the can shall be moved away from the sliding plate 78 (a-c) onto the conveyor 28. This transfer also is realized by pivotally mounted, scythe-shaped transferring means 79a, 79b, and 79c which are operable each by a double-acting air cylinder 80a, 80b, 80c, respectively, from a position in which they are beneath the respective sliding plates through an opening 81a, 81b, 81c in these plates and inwardly over the conveyor 28. The transferring means 79a, 79b, 79c describe an arcuate path and move the can beneath the respective filtering apparatus onto the conveyor 28. The can is now carried by said conveyor to an abutment 82 which arrests the continued movement of the can, whereupon the can is supplied to a can washing machine 84 by a transferring means 83' actuated by an air cylinder 83. Further details of said washing machine will appear from FIG. 4.

Figure 5:
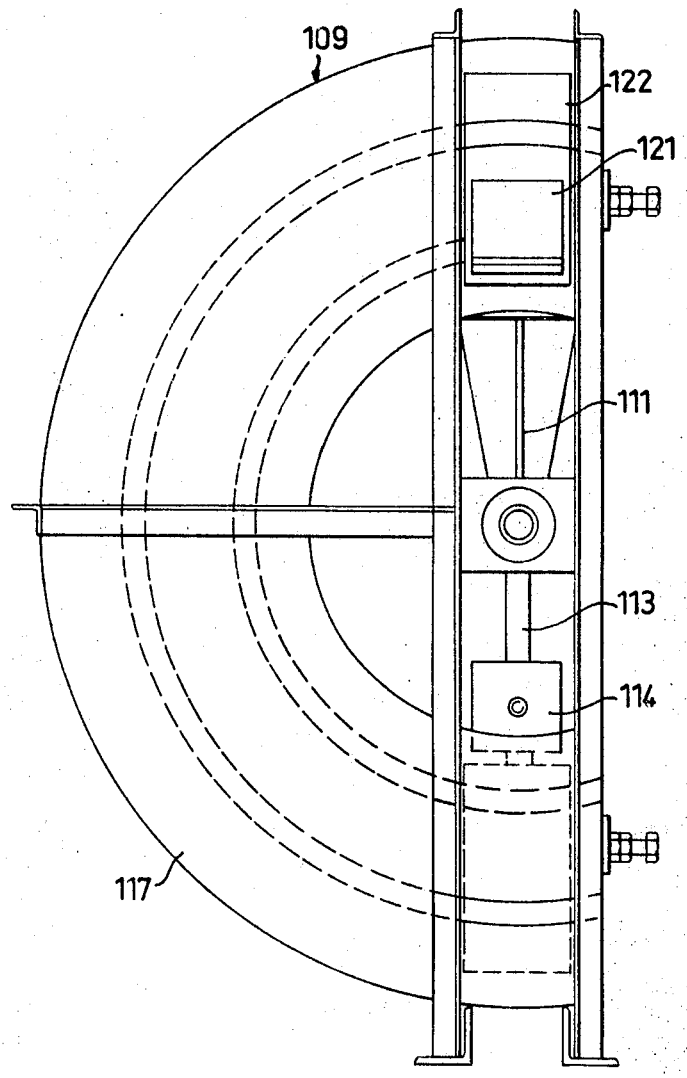
FIG. 5 is a side elevation, in vertical projection, of a device incorporated in the laboratory system for turning the containers upside down.
Figure 6:
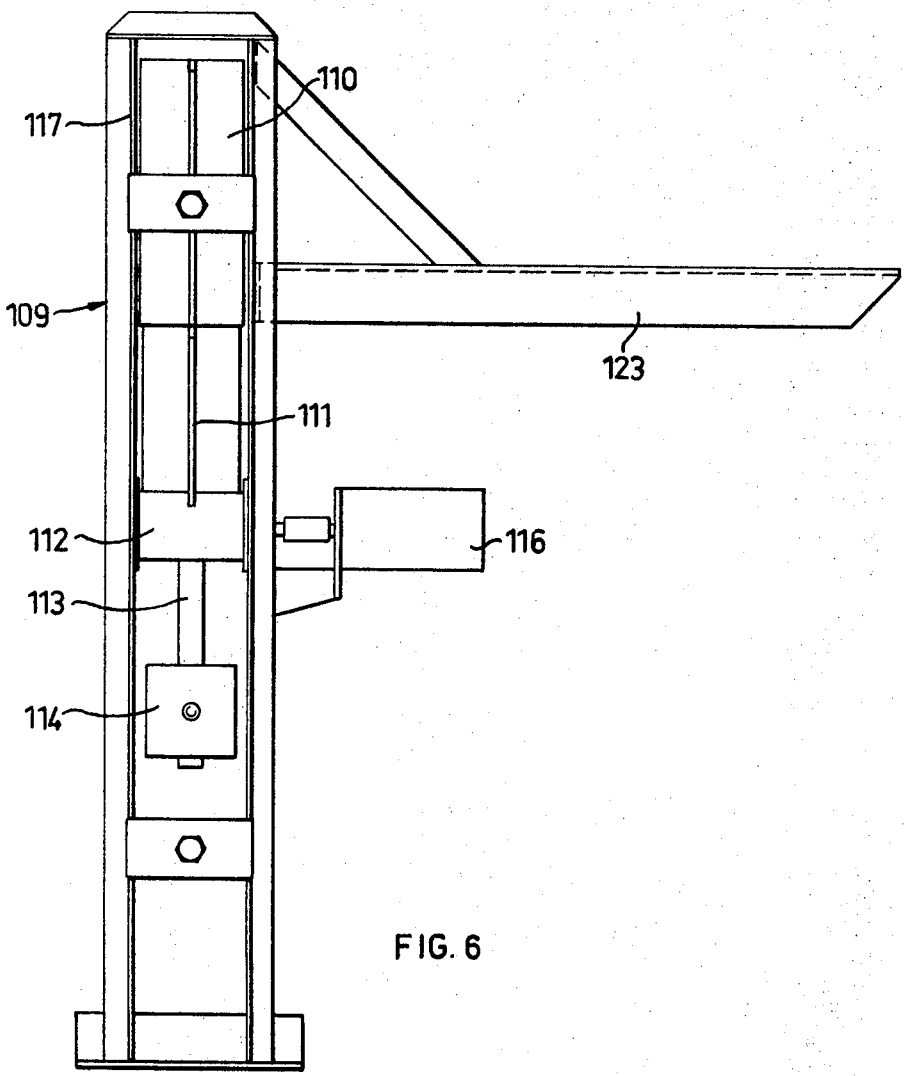
FIG. 6 is a plan view of the device in FIG. 5.
Figure 7:
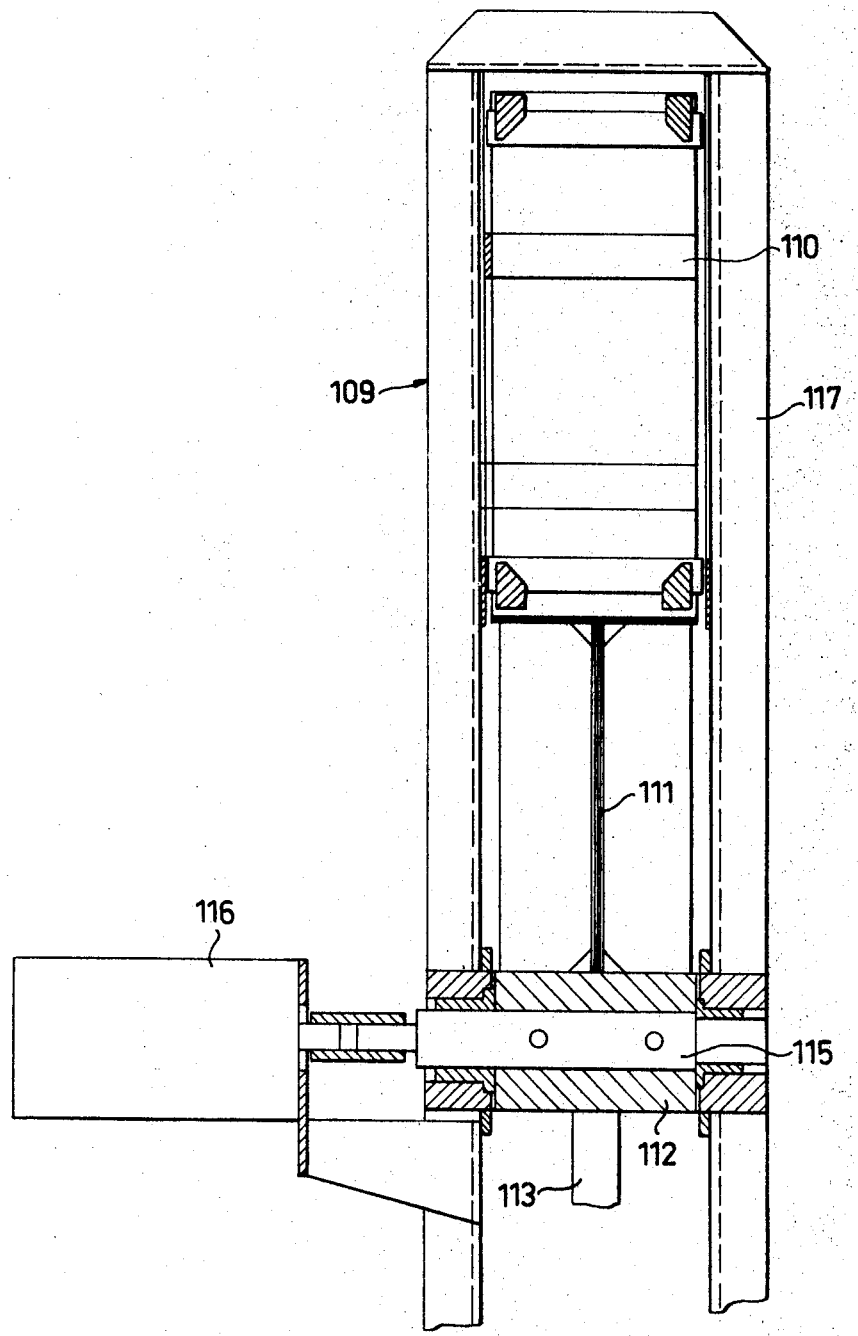
FIG. 7 is a radial section, on a larger scale, of the device in FIGS. 5 and 6.

The can washing machine 84 has a cylindrical housing 85 with two sockets 86 for the supply of hot washing water and a socket 87 for discharge of the washing water as well as the mashed sugar beets and filter cartridges carried along by it. A wheel 88 with chambers 89 radially projecting therefrom is mounted centrally in the cylindrical housing 85, and said chambers are open at their axially opposite ends and are large enough each to receive one can. By rotation of the wheel 88 these chambers are brought in turn of order opposite an opening 90 in the housing 85 which in turn is opposite the transferring means 83'. Said rotation is realized by a double-acting air cylinder 91 operating in dependence on the program device and connected to the wheel 88 by a pawl 92 and a ratchet wheel 93. At each stroke of the air cylinder 91 the wheel 88 is rotated an angle corresponding to the division between the chambers 89 on said wheel 88. The cans are thus transferred in turn of order, according as they arrive at the abutment 82, to each of the chambers 89 by the transferring means 83' when these chambers move past the opening 90, and the cans are placed in the chambers between grid-shaped end supports 94. Stationary vanes 95 are arranged to prevent the cans from moving out of the ends of the chamber as long as the cans are conveyed through the washing machine. While the cans are moved through half a revolution by the rotation of the wheel 88, they are flushed out and cleaned so that upon arrival at a position which is offset by 180° relative to the opening 90 and in which the cans are turned upside down, they have been cleaned from any rests of the sample treated in the can. Opposite the can occupying the last-mentioned position the housing 85 has an opening corresponding to the opening 90 on the opposite side of the housing. In this position the can is moved out of the chamber 89 by a transferring means (not shown) actuated by a double-acting air cylinder 96 and introduceable through an opening 97 in the housing 85. The washed can, still in upside down position, is moved into a closed drying chamber 98 which, for greater clarity, is shown with the cover removed in FIG. 2B. In this chamber the can slides on bars 99, and as a first measure water, if any, is blown away from the upwardly facing bottom of the can by means of hot air which is supplied through an obliquely downwardly directed flat nozzle 100. At the same time hot air is blown into the interior of the can through a nozzle 101 directed upwardly between the bars 99. The can is now passed on through the chamber 98—at right angles to the direction of motion from the washing apparatus 84—by a double-acting air cylinder 102 which actuates a transferring means 103. During its continued movement through the chamber 98 the interior of the can is exposed to cold air streams from upwardly directed nozzles 104 which are also provided between the bars 99, whereby the can is cooled and as a consequence will be substantially cold when it is moved by the transferring means 103 from the bars 99 onto an endless conveyor 105. Said conveyor comprises an endless belt running over return pulleys 106 and 107, the pulley 107 being driven by an electric motor 108 via a belt or chain transmission. The conveyor 105 conveys the cans back to the input end of the laboratory system in a direction opposed to that in which the cans are conveyed by the conveyors 28 and 44. The conveyor 105 is at a level lower than these two conveyors and conveys the cans in upside down position. The cans shall now be carried back turned right way round to the supply point 10, and to this end a can turning means 109 is provided (shown in detail in FIGS. 5–7).

The can turning means 109 comprises a chamber 110 which is secured to a hub 112 by means of an arm 111 and is balanced with the aid of a counter-weight 114 secured to the hub by means of an arm 113. The hub 112 is mounted on a shaft 115 connected to a pneumatic motor 116 providing a rotary movement. Said motor 116 permits swinging the chamber 110 from a lower position to an upper position through 180° within a housing 117. The cans arriving on the conveyor 105 are arrested by a stationary abutment (not shown), and the can engaging the abutment is opposite an opening 118 in the housing 117, through which the can enters the chamber 110 when the latter is in its lower position. The introduction of the can into the chamber 110 through the opening 118 is realized by a double-acting air cylinder 119 which is provided with a transferring means (not shown) to push the can from the conveyor 105 into the chamber 110. The upside down can is now turned right way round while the chamber 110 is swung through 180° by the motor 116, and from the upper position of the chamber 110 the can turned right way round can be moved to the supply point 10 by a double-acting air cylinder 120 having transferring means which is moved into the housing 117 through an opening 121 therein to thereby move the can out of the housing through an opening 122 on the opposite side thereof and along a guide 123 to the supply point 110. It is now possible to use the can again in the manner earlier described for conveying sugar beet samples through the laboratory system.

All functions of the can washing machine and the can turning means for returning to the supply point 110 the cans which have traveled through the laboratory system are controlled by the program device which may comprise several individual operatively interconnected sections. The details of the program control have not been shown considering the present status of the control technics which makes such showing superfluous for a complete understanding of the invention.

Naturally, the invention is not limited to the embodiment described and illustrated, and many constructional modifications may be envisaged within the scope of the appended claims, particularly with regard to the structural design of the various means and devices for handling and conveying the cans.

What I claim and desire to secure by Letters Patent is:

1. Laboratory system for automatically analyzing mashed sugar beet samples in respect of their sugar content, comprising a number of open-top sample containers, such as cans, and conveyor means for moving containers through weighing and analyzing means distributed in a row along the conveyors for performing various analyzing steps and for returning the containers from one end of said analyzing means to said weighing means after they have traveled through said row of means, wherein the conveyor means are belt conveyors for conveying the containers as individual elements loosely placed thereon and comprise a pair of conveyors which are mutually parallel and disposed substantially on the same level as and on either side of said analyzing means for moving the containers through said analyzing means, and means adapted to transfer the containers conveyed by said conveyors from either of said two feed conveyors to an analyzing means and from said analyzing means to the other of said feed conveyors and to transfer the containers between said conveyors on one hand and a return conveyor on the other hand which is disposed on a higher or lower level, while simultaneously turning the containers in order that the containers may be returned in inverted position.

2. Laboratory system as claimed in claim 1, including a pair of weighing means at the entrance end of one of the feed conveyors for supplying mashed sugar beets and water, respectively, while simultaneously weighing the containers with their contents, wherein three grippers are provided for transferring the containers to said two weighing means and from there to said one feed conveyor after the containers have been weighed, said three grippers being simultaneously vertically adjustable and horizontally movable in the contemplated direction of motion of the containers for gripping the containers internally from their upwardly facing open ends.

3. Laboratory system as claimed in claim 1, wherein the means for transferring the containers from either feed conveyor to the stations include abutments for selectively arresting the containers arriving on said conveyor, and means for moving the arrested containers transversely of the contemplated direction of motion of the conveyor onto a stationary base.

4. Laboratory system as claimed in claim 3, wherein the means for transferring the containers from the analyzing means to either advancing conveyor from the stationary base are constituted each by a means which can be moved from below through an opening in the base onto the upper side of the base and along it.

5. Laboratory system as claimed in claim 1, wherein the means for transferring the containers from one feed conveyor to the return conveyor are incorporated in a washing apparatus for washing the containers simultaneously as they are turned.

References Cited

UNITED STATES PATENTS 3,063,390   11/1962   Frank _____ 141—83

HOUSTON S. BELL, Jr., Primary Examiner

U.S. Cl. X.R.

141—92, 100, 170, 171